United States Patent
Gulati et al.

(10) Patent No.: US 7,279,213 B2
(45) Date of Patent: Oct. 9, 2007

(54) HIGH-STRENGTH THIN-WALLED HONEYCOMBS

(75) Inventors: Suresh T. Gulati, Elmira Heights, NY (US); Sujanto Widjaja, Corning, NY (US)

(73) Assignee: Corning Incorporated, Corning, NY (US)

( * ) Notice: Subject to any disclaimer, the term of this patent is extended or adjusted under 35 U.S.C. 154(b) by 356 days.

(21) Appl. No.: 11/012,515

(22) Filed: Dec. 14, 2004

(65) Prior Publication Data

US 2005/0147791 A1    Jul. 7, 2005

Related U.S. Application Data

(60) Provisional application No. 60/533,081, filed on Dec. 29, 2003.

(51) Int. Cl.
*B32B 3/12* (2006.01)

(52) U.S. Cl. ............... 428/116; 428/188; 422/180; 502/527.14; 502/527.19

(58) Field of Classification Search ............ None
See application file for complete search history.

(56) References Cited

U.S. PATENT DOCUMENTS

| | | | |
|---|---|---|---|
| 4,233,351 A | 11/1980 | Okumura et al. | |
| 4,455,336 A | 6/1984 | Ogawa et al. | 428/116 |
| 5,629,067 A * | 5/1997 | Kotani et al. | 428/116 |
| 5,714,228 A | 2/1998 | Beckmeyer et al. | |
| 6,159,431 A | 12/2000 | Inoue et al. | |
| 6,596,056 B2 | 7/2003 | Domesle et al. | 95/285 |
| 7,112,050 B2 * | 9/2006 | Bernas et al. | 425/190 |
| 2002/0192426 A1 | 12/2002 | Ichikawa et al. | |

* cited by examiner

*Primary Examiner*—Jennifer McNeil
*Assistant Examiner*—Timothy M. Speer
(74) *Attorney, Agent, or Firm*—Randall S. Wayland; Kees van der Sterre

(57) ABSTRACT

Thin-walled ceramic honeycomb products of improved resistance to isostatic pressure damage are provided wherein the skin layers disposed over the cellular matrix portions of the honeycombs are formed of ceramic materials differing from the materials of the matrix as to composition, density, or other physical parameters effective to increase the elastic modulus of the skin layer relative to the cellular matrix and thereby reduce pressure-induced tangential strain in regions of the matrix adjacent to the skin layers.

7 Claims, 2 Drawing Sheets

HIGH-STRENGTH THIN-WALLED HONEYCOMBS

This application claims the benefit of U.S. Provisional Application No. 60/533,081, filed Dec. 29, 2003, entitled "High-Strength Thin-Walled Honeycomb", by Suresh T. Gulati, et al.

BACKGROUND OF THE INVENTION

The present invention relates to the design and manufacture of automotive substrates or other ceramic honeycombs exhibiting substantial improvements in isostatic strength over conventional honeycomb while maintaining or even increasing the thermal shock resistance of the parts. The invention is particularly valuable as applied to thin-wall and ultra thin-wall automotive substrates wherein higher isostatic strengths are important for purposes such as packaging and extended service life.

Various methods have been proposed for improving the isostatic strength of thin-wall and ultra thin-wall ceramic honeycomb substrates, i.e., honeycombs having cellular matrix portions formed of ceramic walls in the range of about 20-125 µm in thickness. Some of these methods include increasing the cell density over regions of the cellular matrix portion near the periphery of the parts, thickening the cell walls or webs at the periphery of the cellular matrix portion, thickening web intersections at the periphery by means such as corner rounding or filleting, and thickening or strengthening the skins through the use of strength enhancing coatings or additives. U.S. Patents and patent applications Nos. U.S. Pat. No. 4,233,351-A1, U.S. Pat. No. 6,159,431-B1, U.S. 2002-0192426-A1 and U.S. Pat. No. 5,714,228-B1 are representative.

While these gradual peripheral strengthening approaches are often helpful to increase isostatic strength, they almost invariably result in a reduction in the ability of the thus-modified honeycombs to resist damage from thermal shock. In addition, the web thickening and corner filleting approaches previously proposed for matrix strengthening necessarily reduce the open cross-sections of the honeycombs, resulting in an increased exhaust gas pressure drop across catalytic reactors containing such honeycombs when in use for the treatment of flowing combustion engine exhaust gases.

SUMMARY OF THE INVENTION

The present invention addresses strength deficiencies by reducing the large gradients in tangential compressive stress that arise in thin-walled ceramic honeycomb catalyst support substrates when they are subjected to externally applied pressures. Such pressures are conventionally encountered during the packaging of the honeycombs in catalytic reactors, and can also be generated in the course of subsequent use.

Our analyses indicate that, during the application of both 2D (radial) or 3D (radial and axial) isostatic pressures, large tangential stress gradients are developed at the interface between the skin and cellular matrix regions of these substrates. The magnitude of these pressure-induced stress gradients is dictated by the ratio of cell wall or web thickness to cell spacing in the cellular region of the parts, with higher stresses being developed at lower wall thicknesses and/or at higher cell spacings. Thin-wall and ultra thin-wall ceramic honeycomb substrates, such as currently favored for use in more advanced exhaust emissions control systems, are particularly vulnerable to damage from this source. The substrates conventionally referred to as 400/4, 600/3, 900/2 and 900/1 substrates, the first number referencing cell density in cell/in$^2$ and the second number to cell wall thickness in thousandths of inches (inches×10$^{-3}$), are examples of substrates where increased resistance to pressure damage would be particularly valuable.

According to our analysis the tangential stress gradients arising under externally applied pressures give rise to significant shear and bending of peripheral webbing, particularly the webs forming the walls of cells immediately adjacent to the surface skin layers of these honeycombs. Such shear and bending can generate tensile stresses in the peripheral cellular region that can exceed the tensile strength of the peripheral cell wall segments of the honeycombs, thereby leading to crack initiation and compressive failure of the structures.

In accordance with the present invention these stress gradients are controlled by controlling the physical properties and, optionally, the thickness of the skin. We have found that, for a given cell wall thickness and cell spacing ratio, the skin elastic modulus can be selected such that the stress gradients developed under applied pressures will be modest and acceptable, and the isostatic strength of the honeycombs thereby significantly increased.

In one embodiment of the invention the stress gradients are reduced primarily by increasing the ratio of the skin elastic modulus to that of the elastic modulus of the honeycomb matrix, this being accomplished, for example, by reducing the porosity of the skin relative to that of the walls forming the matrix. Alternatively or in addition to porosity modifications, skin composition modifications can also be employed. Illustrative of that embodiment is a thin-walled ceramic honeycomb product of improved resistance to isostatic stress damage comprising a cellular ceramic matrix portion having a wall thickness in the range of 20-125 µm and a ceramic skin layer disposed over the cellular matrix portion having a thickness in the range of 50-250 µm, with the composition or porosity of the skin layer differing from cellular matrix portion, and the skin layer having an elastic modulus higher than the elastic modulus of the matrix portion.

Providing thicker skin layers on these honeycombs can also reduce pressure-induced core-skin stress gradients, but simple thickness increases are not useful because they increase the susceptibility of the parts to thermal shock damage. We have found, however, that if the composition and/or porosity of the skin is modified in a manner such that the skin has both a higher elastic modulus and a higher coefficient of thermal expansion (CTE) than does the cellular matrix, then thermal stresses arising during the cooling portion of thermal shock cycle can be moderated and the thermal shock resistance of the part rendered acceptable.

Stress gradient reduction through the use of a honeycomb manufacturing process wherein the skin of the honeycomb is co-extruded through an annular die over an unskinned or thinly skinned cellular core provides a particularly flexible approach for modifying skin properties, since it permits the composition, thickness, and even the porosity of the skin to be independently varied over wide limits while maintaining the required chemical and physical properties in the cores and skins. For example, the use of skin compositions offering low porosity in combination with modestly increased CTE values enables the production of ceramic substrates with slightly thickened but substantially stiffer skin layers, these exhibiting significantly reduced susceptibility to pressure-induced stress gradients without unacceptably increasing the risk of thermal shock damage.

DESCRIPTION OF THE DRAWINGS

The invention is further described below with reference to the appended drawings, wherein.

DETAILED DESCRIPTION

Isostatic strength plays a key role during canning of coated substrates. Its value depends on wall porosity, cell density, wall thickness, fillet radius, skin thickness, skin texture, skin/matrix interface and substrate diameter. While advanced honeycomb catalyst substrates with high cell density, thin wall and ultrathin wall offer performance advantages linked to their low mass and high surface area, their isostatic strength may fall short of customer specifications.

For purposes of stress analysis it is appropriate to treat the matrix region of these honeycombs as a transversely isotropic material and the skin region as isotropic material. The applied pressure is partially borne by the skin and the remainder is transmitted to the matrix through the skin/matrix interface.

The 3D-elasticity solution of transmitted pressure is based on equality of tangential strain at that interface, and predicts tangential compressive stresses in the skin and matrix. Whether honeycomb failure under applied compressive stress initiates in the skin or matrix or skin/matrix interface depends on the magnitude of stress and the corresponding strength value. The interfacial region, for example, may experience bending of cell walls, notably along the 45° direction, due to a large tangential compressive stress in the skin. Such bending can induce tensile stresses which can lead to failure if their magnitude exceeds the tensile strength of the ceramic material forming the honeycomb. In accordance with the invention these bending stresses are reduced by minimizing skin compressive strain via control over skin stiffness.

Figure 1:
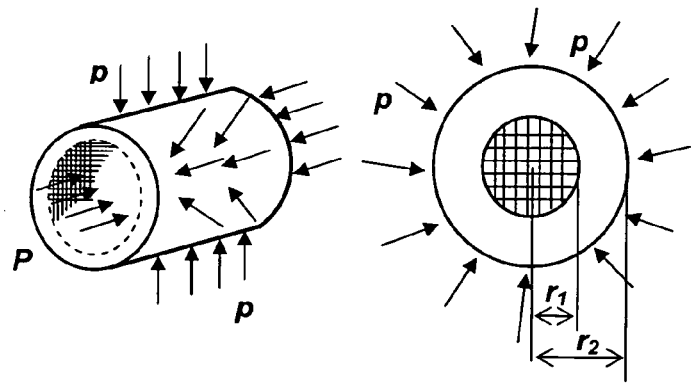
FIG. 1 is a schematic diagram illustrating the forces on an automotive honeycomb catalyst substrate subjected to 3-dimensional isostatic pressure.
Figure 2:
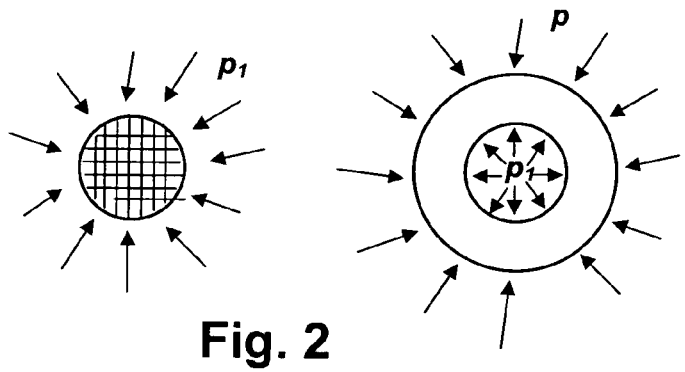
FIG. 2 schematically illustrates the transmission of pressure from the skin to the matrix of such a substrate.
Figure 3:
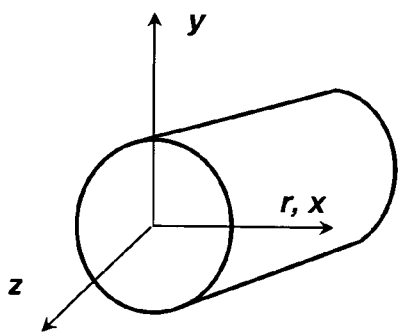
FIG. 3 defines a polar coordinate system for the analysis of pressure-generated stresses in honeycomb substrates.

FIG. 1 is a schematic diagram illustrating the forces on an automotive honeycomb catalyst substrate subjected to isostatic pressure p on its skin, entry and exit faces. In that diagram, $r_1$ and $r_2$ denote the radius of matrix and skin, respectively. The applied pressure p is transmitted to the matrix as $p_1$ which is less than p. An equal and opposite pressure, namely $p_1$, is experienced by the skin at $r=r_1$. FIG. 2 illustrates the transmission of pressure to the matrix via the skin at their interface defined by $r=r_1$. The axial pressure on end faces remains constant at p. The boundary conditions for matrix and skin, expressed in the polar coordinate system shown in FIG. 3, are:

$$\left.\begin{array}{ll} \sigma_r = \sigma_\theta = -p_1 & \text{at } r = r_1 \\ \sigma_z = -p = \text{constant} & \end{array}\right\} \text{matrix} \quad (1)$$

$$\left.\begin{array}{ll} \sigma_r = -p_1 & \text{at } r = r_1 \\ \phantom{\sigma_r} = -p & \text{at } r = r_2 \\ \sigma_z = -p = \text{constant} & \end{array}\right\} \text{skin} \quad (2)$$

The matrix is treated as a transversely isotropic material with the following elastic modulii and Poisson's ratios:

$$\left.\begin{array}{l} E_\theta = E_r = E \\ E_z = 2E \\ \nu_{r\theta} = \nu \\ \nu_{rz} = \nu_{\theta z} = \nu' \end{array}\right\} \text{matrix} \quad (3)$$

The stress-strain relations, taken from the literature, are then:

$$\left.\begin{array}{l} \varepsilon_r = \dfrac{\sigma_r}{E} - \dfrac{\nu \sigma_\theta}{E} - \dfrac{\nu' \sigma_z}{2E} \\[4pt] \varepsilon_\theta = \dfrac{\sigma_\theta}{E} - \dfrac{\nu \sigma_r}{E} - \dfrac{\nu' \sigma_z}{E} \\[4pt] \varepsilon_z = \dfrac{\sigma_z}{2E} - \dfrac{\nu' \sigma_r}{E} - \dfrac{\nu' \sigma_\theta}{E} \end{array}\right\} \text{matrix} \quad (4)$$

Substituting Eq. (1) in the expression for $\varepsilon_\theta$, we obtain:

$$\varepsilon_{\theta m} = \dfrac{\nu' p}{2E} - \left(\dfrac{1-\nu}{E}\right) p_1 \quad \text{at } r = r_1 \text{ for matrix} \quad (5)$$

Treating the skin as an isotropic material with elastic modulus E' and Poisson's ratio $\nu'$, the stress-strain relations from the literature are given by:

$$\left.\begin{array}{l} \varepsilon_r = \dfrac{1}{E'}[\sigma_r - \nu'(\sigma_\theta + \sigma_z)] \\[4pt] \varepsilon_\theta = \dfrac{1}{E'}[\sigma_\theta - \nu'(\sigma_r + \sigma_z)] \\[4pt] \varepsilon_z = \dfrac{1}{E'}[\sigma_z - \nu'(\sigma_\theta + \sigma_r)] \end{array}\right\} \text{skin} \quad (6)$$

To obtain $\varepsilon_{\theta s}$ at $r=r_1$ we need, in addition to Eq. (2), the solution for $\sigma_{\theta s}$ which is taken from the literature as:

$$\sigma_{\theta s} = \left(\dfrac{r_2^2 + r_1^2}{r_2^2 - r_1^2}\right) p_1 - \left(\dfrac{2 r_2^2}{r_2^2 - r_1^2}\right) p \quad \text{at } r = r_1 \text{ for skin} \quad (7)$$

Substituting Eqs. (2) and (7) into the expression for $\varepsilon_\theta$ in Eq. (6) yields $$\varepsilon_{\theta s} = \frac{1}{E'}\left[\left(\frac{r_2^2 + r_1^2}{r_2^2 - r_1^2}\right)p_1 - \left(\frac{2r_2^2}{r_2^2 - r_1^2}\right)p + v'(p + p_1)\right] \quad (8)$$

at $r = r_1$ for skin

For part integrity the radial displacement from the matrix to skin region at $r=r_1$ is equivalent, meaning that $\epsilon_{\theta m}$ and $\epsilon_{\theta s}$ must be equal. Equating Eqs. (5) and (8) results in the following relationship between p and $p_1$:

$$p_1 = \left[\frac{\left(\frac{v'}{2} - v'\frac{E}{E'}\right)\frac{t_s}{r_1} + \left(\frac{E}{E'}\right)\left(1 + 2\frac{t_s}{r_1}\right)}{\left(1 - v + v'\frac{E}{E'}\right)\frac{t_s}{r_1} + \left(\frac{E}{E'}\right)\left(1 + \frac{t_s}{r_1}\right)}\right]p \quad (9)$$

where $t_s = r_2 - r_1$ denotes skin thickness. Denoting the quantity in the square bracket by $\lambda$ it is easy to show that $\lambda < 1$. Other special cases that follow from Eq. (9) are:

i) $t_s \to 0$, then $p_1 \to p$ ii) $t_s \to \infty$, then $p_1 = \left[\frac{\frac{v'}{2} + (2-v')\frac{E}{E'}}{1 - v + (1+v')\frac{E}{E'}}\right]p \quad (10)$ iii) $\frac{E}{E'} \to 0$, then $p_1 = \left[\frac{v'}{2(1-v)}\right]p = 0.134p \quad (11)$ iv) $E' \to E$, then $p_1 \to p \quad (12)$ In other words, ultrathin or equi-stiff skin transmits all of the isostatic pressure to the matrix. Similarly, as the skin gets thicker the pressure transmitted to matrix decreases in accordance with Eq. (9).

Rewriting Eq. (9)

$$p_1 = \lambda p \quad (13)$$

$$\lambda = \left\{\frac{\left(\frac{v'}{2} - v'\frac{E}{E'}\right)t_s + \left(\frac{E}{E'}\right)(r_1 + 2t_s)}{\left(1 - v + v'\frac{E}{E'}\right)t_s + \left(\frac{E}{E'}\right)(r_1 + t_s)}\right\}$$

and substituting in Eqs. (6) and (7) yields $$\sigma_{\theta s} = -\left[\left(\frac{r_1}{t_s} + 1\right)(1-\lambda) + 1\right]p$$
$$\varepsilon_{\theta s} = -\left[\left(\frac{r_1}{t_s} + 1\right)(1-\lambda) + 1 - v'\right]\frac{p}{E'}$$ at $r = r_1$ $\quad (14)$ Similarly, from Eqs. (1) and (13)

$$\sigma_{\theta m} = -\lambda p \text{ at } r = r_1 \quad (15)$$

At present, commercially useful thin-walled cordierite honeycomb products have $r_1$ values ranging from about 40 to 50 mm, with $t_s$ ranging from 0.4 to 0.6 mm. Since $\lambda \sim 0.9$ for most applications, it follows that $$\frac{\sigma_{\theta s}}{\sigma_{\theta m}} > 10$$

Figure 4:
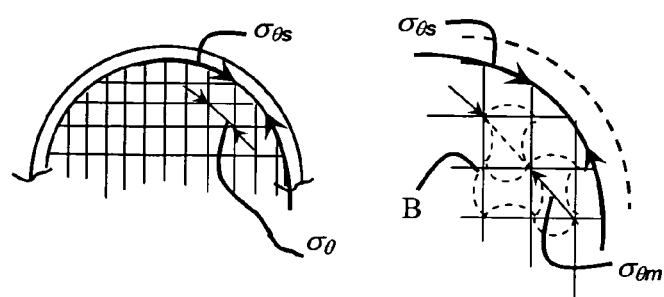
FIG. 4 illustrates the effects of surface applied pressures on the tangential stresses in the peripheral cell wall portions of the core or matrix of a honeycomb substrate.

Physically this large gradient in $\sigma_\theta$ at the matrix/skin interface is due to stiffness change of an order of magnitude across that interface. FIG. 4 of the drawing shows a schematic of bending of interfacial cells in a honeycomb catalyst support structure due to the large gradient in tangential compressive stress from skin to matrix at $r=r_1$. Such bending is most severe where the elastic moduli ratio E/E' is the largest, e.g. at $\theta = \pi/4$, $3\pi/4$, $5\pi/4$ and $7\pi/4$ radians around the circumference of the structure. If the matrix or skin is made stiffer near the skin region, e.g. by increasing skin or cell wall thickness and/or using fillets at the cell/skin interface, $\lambda$ approaches unity and so does $\sigma_{\theta s}/\sigma_{\theta m}$.

It is known from the literature that:

$$E = \left(\frac{t_w}{L}\right)E_w \quad (16)$$

$$E_w = \left(\frac{1 - P_w}{1 + 4P_w}\right)E_o \quad (17)$$

where $t_w$ and L denote cell wall thickness and cell spacing respectively, $P_w$ denotes fractional porosity of the walls, and $E_o$ denotes elastic modulus of dense cordierite with an estimated value of $14 \times 10^6$ psi (100 GPa). Thus increasing cell wall thickness $t_w$ to increase matrix stiffness E increases $\lambda$ and reduces the stress gradient $\sigma_{\theta s}/\sigma_{\theta m}$ at the skin:core interface of the honeycomb.

Figure 5:
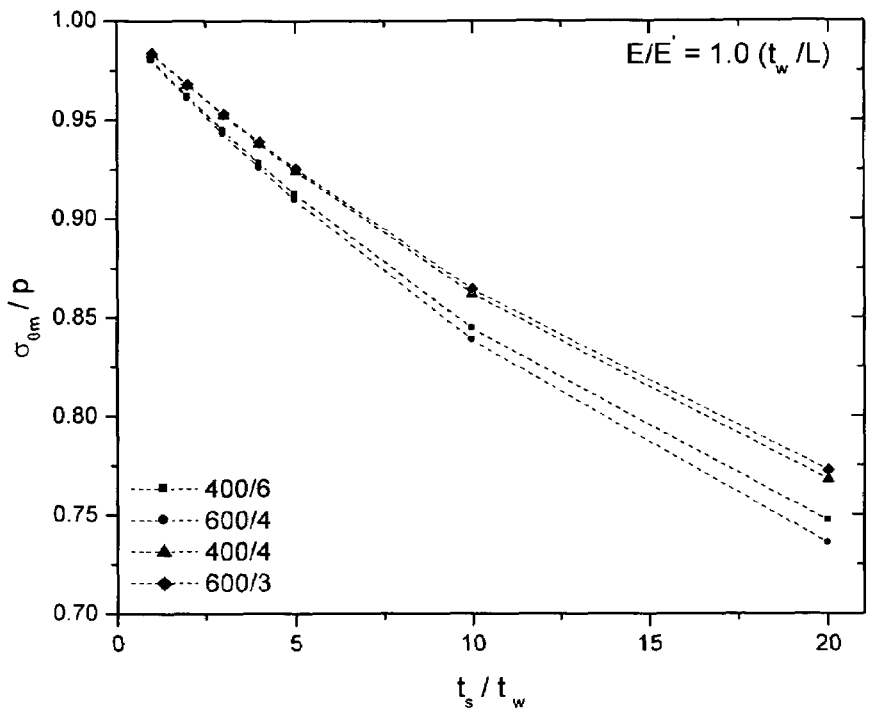
FIG. 5 graphically illustrates the effects of skin thickening on the matrix stresses arising in honeycomb substrates subjected to isostatic pressure.

Increasing skin thickness $t_s$ can also reduce tangential matrix stress and strain, and thereby reduce cell wall deflection under applied stress. The substantial reductions in matrix tangential stress $\sigma_{\theta m}$ than can result from increased skin thickness are shown for four conventional honeycombs designs in FIG. 5 of the drawings. The data in FIG. 5 is presented with respect to the four commercial honeycomb matrix geometries (cell spacing L and wall thickness $t_w$) reported in Table 1 below. The fixed cell wall or web thickness, cell density and wall porosity of each honeycomb type fixes the matrix elastic modulus E of that design; accordingly the changes in tangential stress $\sigma_{\theta m}$ shown in FIG. 5 are due entirely to skin thickening.

TABLE 1

Geometric and Physical Parameters of Thin-walled Ceramic Honeycomb Substrates

| Substrate Design (cell density [cells/in$^2$]/wall thickness [in × 10$^{-3}$]) | 400/6 | 400/4 | 600/3 | 600/4 |
|---|---|---|---|---|
| L (inches) | 0.050 | 0.050 | 0.0408 | 0.0408 |
| $t_w$ (inches) | 0.0065 | 0.0045 | 0.0035 | 0.0043 |
| $P_w$ | 34.5% | 34.5% | 34.5% | 34.5% |
| $t_w/L$ | 0.13 | 0.09 | 0.088 | 0.107 |

Unfortunately neither skin thickening alone nor cell wall thickening at the skin:matrix interface constitutes a viable strengthening approach for use with thin-walled ceramic honeycomb structures because each almost invariably results in at least some reductions in the thermal shock durability of the honeycombs. The invention therefore involves the approach of increasing the skin:core elastic modulus ratio E'/E by increasing skin stiffness rather than skin thickness. This approach substantially reduces the compressive strain $\epsilon_{\theta s}$ experienced by the skin upon the application of isostatic pressure to the surfaces of the honeycombs, and can thereby significantly improve product strength without any adverse effect on the thermal shock performance of the products.

Figure 6:
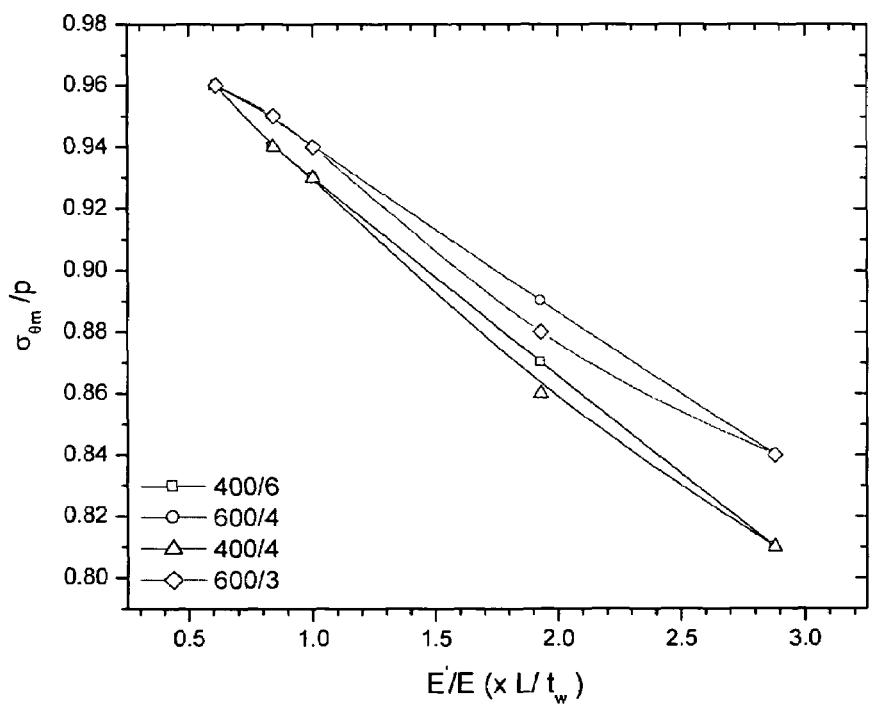
FIG. 6 graphically illustrates the effects of skin stiffening on the matrix stresses arising in honeycomb substrates subjected to isostatic pressure.

The effects of increased skin stiffness on stress and strain variables in conventional honeycombs can be shown by evaluating those variables for several honeycombs of the designs reported in Table 1 above. Calculations of the variables $\epsilon_{\theta s}$, $\sigma_{\theta s}$ and $\sigma_{\theta m}$ per unit of applied isostatic pressure p are reported in Table 2 below, these being derived from the substitution of the physical parameters $r_1 = 46.5$ mm, $v = 0.07$; $v' = 0.25$ and $t_s/t_w = 4$ into equations (13), (14) and (15) above while setting values of E'/E ratio ranging from 0.6 $L/t_w$ to approximately 3 $L/t_w$. The data for tangential matrix stress $\sigma_{\theta m}$ are plotted in FIG. 6 of the drawings. A study of these data indicates that increasing the skin:core elastic modulus ratio via increases in skin elastic modulus can reduce tangential strain $\epsilon_{\theta s}$ in the skin by more than 20%, resulting in lower matrix tangential stress $\sigma_{\theta m}$ by about 15%.

the matrix. The result is that these honeycombs experience much higher compressive skin strains than had been appreciated, strains that are clearly sufficient to "squeeze" interfacial cells in the matrix and induce cell bending stresses that lead to cell wall fractures and premature honeycomb failure.

The invention provides a solution to this problem, which is not to increase wall thickness and strength, or to increase skin thickness to reduce skin strain, but instead to increase skin stiffness. The data presented above demonstrates that increasing the ratio of skin modulus E' to matrix modulus E by increasing the skin modulus is very effective to increase the structural resistance of these ceramic honeycombs to stress failure without decreasing the resistance of the part to thermal shock damage.

As noted above, a number of different methods to increase skin elastic modulus can be successfully employed to increase part strength in accordance with the invention. Among the methods that are most effective are those that reduce the porosity of the skin and/or change the composition of the skin to increase its elastic modulus. In preferred embodiments of the invention the skin porosity will be lower than the porosity of the matrix portion, and in fact fully densified skin layers of zero porosity are useful in appropriate cases.

TABLE 2

Tangential Stress and Strain in Thin-walled Honeycombs

| E'/E | 400/6 | | | 600/4 | | | 400/4 | | | 600/3 | | |
|---|---|---|---|---|---|---|---|---|---|---|---|---|
| | $\sigma_{\theta m}/p$ | $\sigma_{\theta s}/p$ | $\epsilon_{\theta s}/p$ | $\sigma_{\theta m}/p$ | $\sigma_{\theta s}/p$ | $\epsilon_{\theta s}/p$ | $\sigma_{\theta m}/p$ | $\sigma_{\theta s}/p$ | $\epsilon_{\theta s}/p$ | $\sigma_{\theta m}/p$ | $\sigma_{\theta s}/p$ | $\epsilon_{\theta s}/p$ |
| 0.61 $L/t_w$ | 0.96 | 4.05 | 1.74 | 0.96 | 4.92 | 2.11 | 0.96 | 5.62 | 2.41 | 0.96 | 5.93 | 2.54 |
| 0.84 $L/t_w$ | 0.94 | 5.31 | 1.64 | 0.95 | 6.51 | 2.02 | 0.94 | 7.44 | 2.30 | 0.95 | 7.88 | 2.44 |
| 1.0 $L/t_w$ | 0.93 | 6.16 | 1.60 | 0.94 | 7.58 | 1.97 | 0.93 | 8.66 | 2.25 | 0.94 | 9.19 | 2.39 |
| 1.93 $L/t_w$ | 0.87 | 10.6 | 1.42 | 0.89 | 13.27 | 1.78 | 0.86 | 15.01 | 2.02 | 0.88 | 16.17 | 2.17 |
| 2.88 $L/t_w$ | 0.81 | 14.4 | 1.30 | 0.84 | 18.33 | 1.65 | 0.81 | 20.53 | 1.85 | 0.84 | 22.39 | 2.02 |

The elastic solutions presented above are applicable to the conditions of skin and matrix stress and strain arising under 3D isostatic pressure. However 2D isostatic loading is perhaps more typical of the stresses encountered by ceramic honeycomb catalyst substrates during the canning process of enclosing those substrates in metal reactor enclosures. Similar analyses based on the same geometric and physical characteristics of these honeycombs are straightforward, and these 2D analyses show that 2D isostatic pressure is no less stressful, and in fact more stressful than 3D pressure applied to the same substrates. Typically, assuming the same strain-controlled failure and again equating skin tangential strain to matrix tangential strain at the skin/matrix interface, the analytical solutions show that the higher compressive strains developed under 2D loading produce measured 2D-isostatic strengths averaging 14% lower than the 3D-isostatic strengths for the same thin-walled ceramic substrates.

In either case, it is apparent from the foregoing that over 90% of the isostatic pressure applied to the skin and end faces of ceramic honeycomb substrates is transmitted to the matrix region in a manner inducing compressive stresses within those substrates whose magnitude in the tangential direction is an order of magnitude higher in the skin than in Applying skin layers of modified composition and elastic modulus to the surfaces of ceramic honeycombs is most efficiently carried out during the extrusion process. Honeycomb extrusion dies of conventional design may be mounted on extruders configured to supply a different batch composition to the peripheral or "skin feed" portion of the die than is supplied to the central or matrix portion of the die. The compositions of the batches can be routinely adjusted to match core and skin extrusion rates so that the extruding skin is formed at a velocity matching that of the extruding cellular matrix or core of the honeycomb. Alternatively, the honeycomb matrix or core can be extruded without a skin or, more preferably, with a thin skin matching the core in composition, and a second skin of an appropriately higher elastic modulus thereafter applied to the extruded honeycomb core by a suitable supplemental coating process.

The increase in skin:matrix elastic modulus ratio necessary to achieve significant honeycomb strength increases will vary depending upon the geometry, porosity and composition of the honeycombs, but can readily be determined by experiment. Based on the calculations presented in Table 2 above the value of the skin:matrix elastic modulus ratio E'/E for a honeycomb of cell spacing L and matrix wall thickness $t_w$ should be at least 1.1 times the cell spacing/matrix wall thickness ratio $L/t_w$. More preferably, E'/E ratios of 1.5-3 times the $L/t_w$ ratio will be provided, with E' corresponding to the elastic modulus of the skin and E being the elastic modulus of the matrix considered as a transversely isotropic medium that depends on the cell spacing L, matrix wall thickness $t_w$, porosity $p_w$ and fully densified elastic modulus $E_0$ of the ceramic material forming the cell walls in accordance with the expressions:

$$E = \left(\frac{t_w}{L}\right)E_w \text{ and } E_w = \left(\frac{1-P_w}{1+4P_w}\right)E_o$$

As will be appreciated, is it important when considering coating approaches for adjusting skin elastic modulus not to utilize coating materials for filling skin pores or building up skin thickness that excessively increase skin thermal expansion or thickness. As is well known, increases in either can result in unacceptable reductions in the ability of the coated substrates to resist thermal shock damage.

However, whereas excessive skin thickening is to be avoided in order to avoid thermal shock effects, slight skin thickening, e.g., from values as low as 2 times the cell wall thickness to values in the range of about 3-8 times the cell wall thickness or more, can be used a supplemental strengthening method. In that case, however, the resulting effects of skin thickening on thermal shock resistance should be mitigated by adjusting skin thermal expansion coefficient to be slightly higher than the matrix thermal expansion coefficient, and by strengthening the skin. Decreasing skin porosity for the primary purpose of increasing its elastic modulus E' has the beneficial effect of increasing skin strength, thereby enabling the use of thicker, higher expansion skin layers than would otherwise be possible. In preferred embodiments, however, the difference in the average linear coefficient of thermal expansion between the core and skin should not exceed about $2\times10-7/C$ over the temperature range 25-800° C. for best thermal downshock performance in the final honeycomb.

Of course, the foregoing examples and descriptions are merely illustrative of the invention, and are not intended to be limiting. The invention is not restricted, for example to ceramic honeycombs of square cell cross-sectional shape; triangular, hexagonal, or other cell shapes can equally effectively be improved. Similarly, honeycomb part cross-sections other than the cylindrical honeycombs specifically described above are included, examples of such part cross-sections including ovals, bi-radials, elliptical, "racetrack" and triangular honeycomb shapes well known in the art. Accordingly, these and other variations of the specific examples of the invention hereinabove described may be practiced within the scope of the appended claims.

We claim:

1. A thin-walled ceramic honeycomb product of improved resistance to isostatic pressure damage comprising:
    a cellular matrix portion having a wall thickness in the range of 20-125 μm, and
    a skin layer disposed over the cellular matrix portion having a thickness in the range of 50-250 μm, a composition, crystalline morphology, or porosity differing from cellular matrix portion, and an elastic modulus higher than the elastic modulus of the matrix portion.

2. A honeycomb product in accordance with claim 1 wherein the skin layer differs in porosity from the cellular matrix portion.

3. A honeycomb product in accordance with claim 1 wherein the skin layer differs in composition or crystalline morphology from the cellular matrix portion.

4. A honeycomb product in accordance with claim 1 wherein the skin layer has a porosity lower than the porosity of the matrix portion and an average linear coefficient of thermal expansion that is higher than the average linear coefficient of thermal expansion than the matrix portion.

5. A honeycomb product in accordance with claim 1 where the cell density of the cellular matrix portion is in the range of 62-200 cells per cm2 of honeycomb cross-section.

6. A thin-walled ceramic honeycomb product of improved resistance to isostatic pressure damage comprising:
    a ceramic cellular matrix portion having an matrix elastic modulus E determined by the expressions:

$$E = \left(\frac{t_w}{L}\right)E_w \text{ and } E_w = \left(\frac{1-P_w}{1+4P_w}\right)E_o$$

wherein $t_w$ is the wall thickness of the matrix portion, L is the cell spacing of the matrix portion, $P_w$ is the porosity of the ceramic material making up the matrix portion, and $E_0$ is the fully densified elastic modulus of the ceramic making up the cellular matrix portion; and
    a ceramic skin layer disposed over the cellular matrix portion having an skin elastic modulus E',
    wherein the ratio of the skin elastic modulus E' to the matrix elastic modulus E is at least 1.1 times the cell spacing/matrix wall thickness ratio $L/t_w$.

7. A ceramic honeycomb product in accordance with claim 6 wherein the ratio of the skin elastic modulus E' to the matrix elastic modulus E is at least 1.5-3 times the cell spacing/matrix wall thickness ratio $L/t_w$.

* * * * *